(12) United States Patent
Diaz

(10) Patent No.: US 7,077,610 B2
(45) Date of Patent: Jul. 18, 2006

(54) TOGGLE BOLT DEVICE

(75) Inventor: Carroll Diaz, Cut Off, LA (US)

(73) Assignee: Buern USA, L.L.C., Cut Off, LA (US)

( * ) Notice: Subject to any disclaimer, the term of this patent is extended or adjusted under 35 U.S.C. 154(b) by 0 days.

(21) Appl. No.: 10/071,786

(22) Filed: Feb. 7, 2002

(65) Prior Publication Data
US 2005/0019132 A1 Jan. 27, 2005

(51) Int. Cl.
F16B 21/00 (2006.01)
(52) U.S. Cl. .................. 411/344; 411/21; 411/349; 411/348; 411/354; 411/355; 411/549; 411/551; 411/552; 411/553
(58) Field of Classification Search .............. 411/21, 411/347, 348, 349, 549, 550, 551, 354, 355, 411/552, 553; 269/43, 49
See application file for complete search history.

(56) References Cited

U.S. PATENT DOCUMENTS

| 499,444 | A | * | 6/1893 | Schumann | 411/344 |
|---|---|---|---|---|---|
| 1,169,635 | A | * | 1/1916 | Grimes | 411/344 |
| 1,247,621 | A | * | 11/1917 | Bennett | 411/26 |
| 1,520,123 | A | * | 12/1924 | Gillen | 411/344 |
| 2,597,857 | A | * | 5/1952 | Francesco | 411/344 |
| 2,782,672 | A | * | 2/1957 | Davis | 411/354 X |
| 2,877,818 | A | * | 3/1959 | Johnson | 411/347 X |
| 3,238,834 | A | * | 3/1966 | Appleberry | 411/347 |
| 3,312,138 | A | * | 4/1967 | Cumming | 411/21 |
| 3,466,965 | A | * | 9/1969 | McCarthy | 411/348 X |
| 3,946,636 | A | | 3/1976 | Grey | |
| 4,047,462 | A | | 9/1977 | Hurtig | |
| 4,079,655 | A | | 3/1978 | Roberson, Jr. | |
| 4,293,259 | A | * | 10/1981 | Liebig | 411/32 |
| 4,294,570 | A | * | 10/1981 | Meschnig | 411/103 |
| 4,453,845 | A | | 6/1984 | Donan, Jr. | 405/259 |
| 4,557,631 | A | | 12/1985 | Donan, Jr. et al. | 405/259 |
| 4,693,389 | A | * | 9/1987 | Kalen | 220/236 |
| 5,108,240 | A | | 4/1992 | Liebig | 411/344 |
| 5,573,495 | A | * | 11/1996 | Adler | 600/204 |
| 5,702,215 | A | * | 12/1997 | Li | 411/21 |
| 5,865,559 | A | | 2/1999 | Yang | 403/322 |
| 6,056,489 | A | * | 5/2000 | Keller | 411/21 |
| 6,161,999 | A | | 12/2000 | Kaye et al. | 411/344 |
| 6,203,260 | B1 | | 3/2001 | Henline et al. | 411/340 |

FOREIGN PATENT DOCUMENTS

| DE | 1 092 415 | 11/1960 |
|---|---|---|
| DE | 1 936 360 | 5/1970 |
| FR | 1236439 | 6/1960 |

* cited by examiner

Primary Examiner—Robert J. Sandy
Assistant Examiner—David Reese
(74) Attorney, Agent, or Firm—Garvey, Smith, Nehrbass & North, L.L.C.; Charles C. Garvey, Jr.

(57) ABSTRACT

A toggle bolt type connector has projecting locking members that extend and retract when a central drive shaft is rotated. The exterior of the connector has a body that is partially threaded to receive a nut so that two structures (eg. flanges, panels, plates, beams, etc.) can be pulled together by tightening the bolt when the locking members are in the extended position.

20 Claims, 4 Drawing Sheets

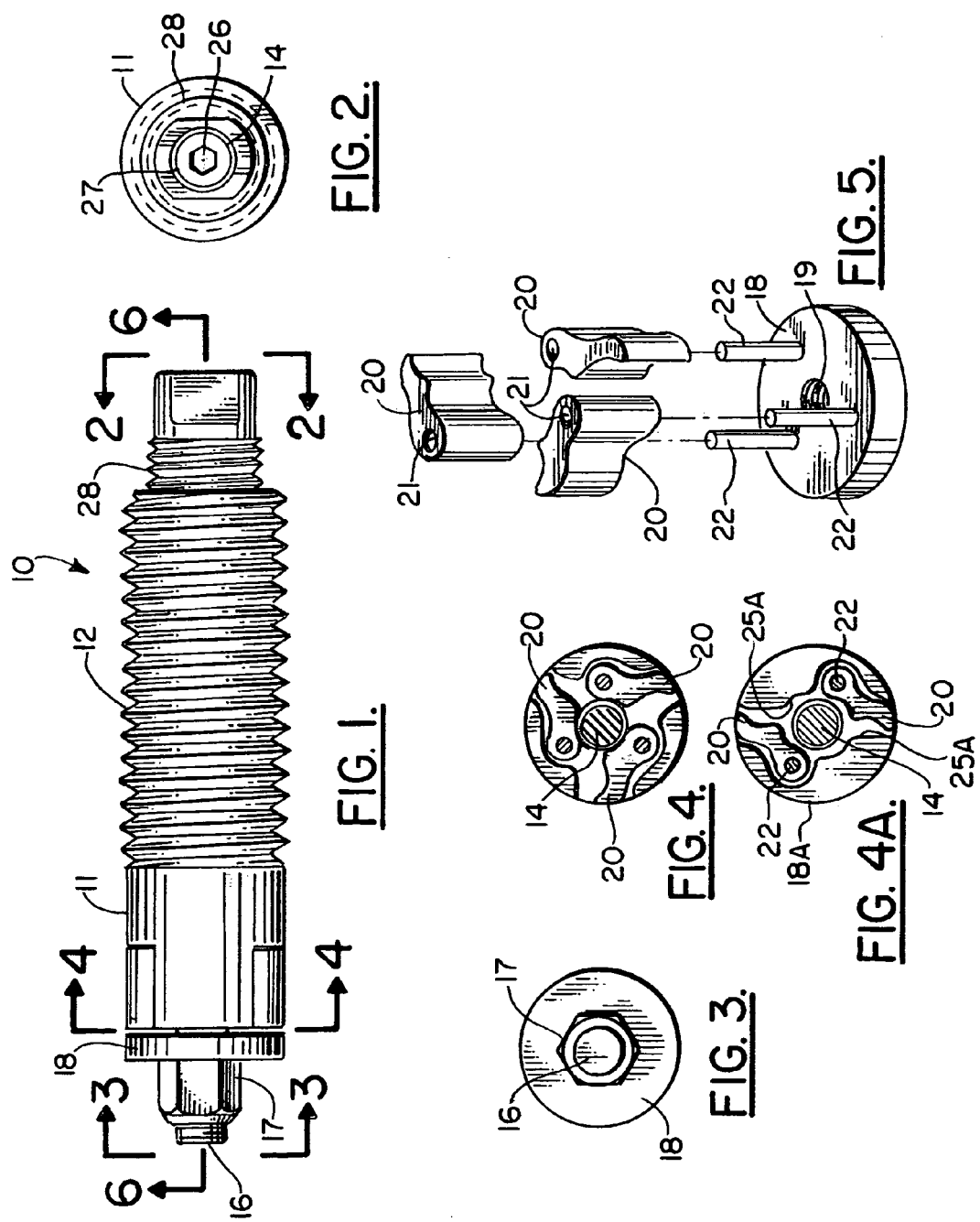

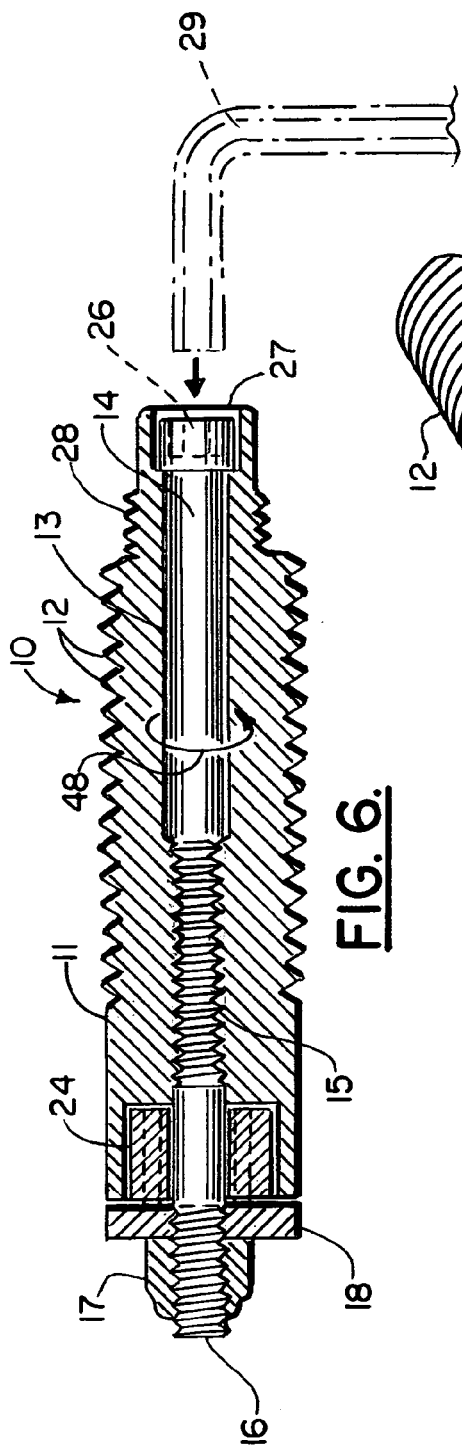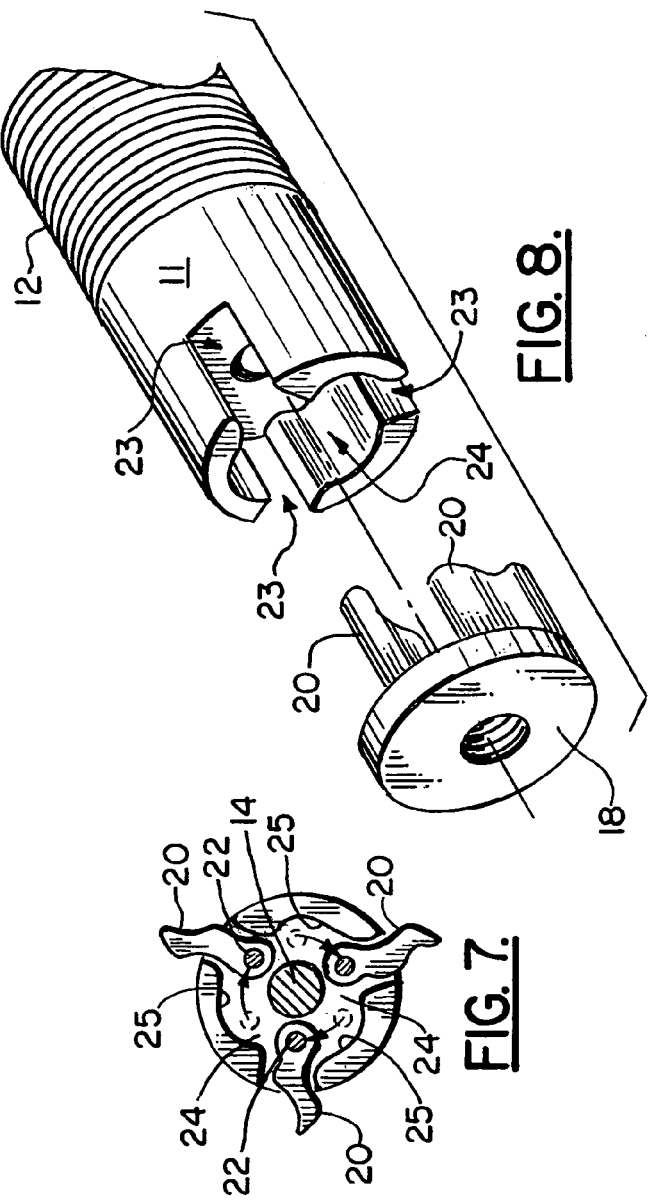

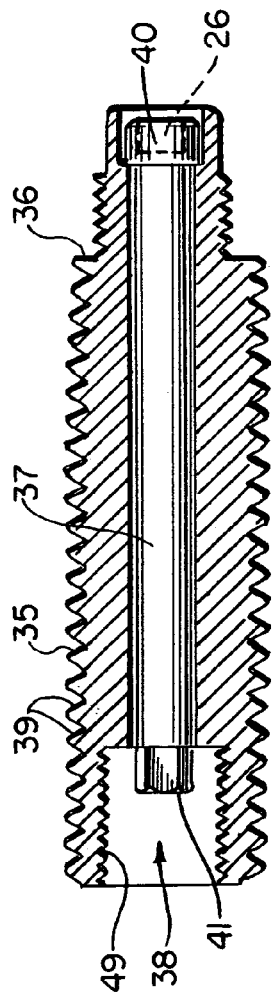
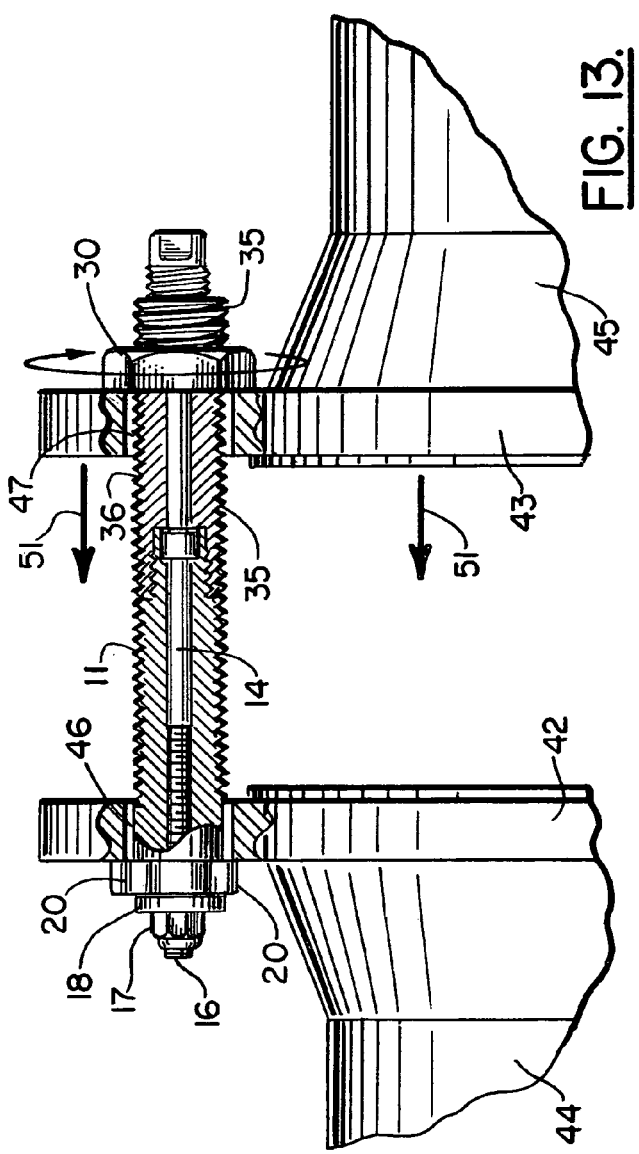
FIG. 12.
FIG. 13.

TOGGLE BOLT DEVICE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fasteners. More particularly, the present invention relates to a toggle bolt type fastener that can be used for holding or compressing multiple items together such as structural panels, flanges, or the like. Even more particularly, the present invention relates to an improved toggle bolt type fastener device that features an outer body with an inner rotating shaft, rotation of the shaft moving a plurality of locking members between extended and retracted positions or between retracted and extended positions.

2. General Background of the Invention

Many types of fasteners have been patented that are designed to extend through multiple panels or wall members or through a single wall member. Such fasteners are designed to form a connection between multiple panels or between opposing sides of a particular panel or wall. Many of these fasteners are known as toggle bolts. Examples of patents disclosing toggle bolts and related fasteners are listed in the following table.

| Pat. # | Title | Issue Date |
| --- | --- | --- |
| 1,169,635 | Pipe Hanger | Jan. 25, 1916 |
| 3,312138 | Expansion Shell for Rock Bolts | Apr. 04, 1967 |
| 3,946,636 | Toggle Bolt | Mar. 30, 1976 |
| 4,047,462 | Toggle Bolt | Sep. 13, 1977 |
| 4,079,655 | Toggle Bolt | Mar. 21, 1978 |
| 4,453,845 | Base Thrust Anchor Shell Assembly | Jun. 12, 1984 |
| 4,557,631 | Off-Center Rock Bolt Anchor and Method | Dec. 10, 1985 |
| 5,108,240 | Heavy Load Bearing Toggle Bolt | Apr. 28, 1992 |
| 5,865,559 | Float Pins | Feb. 02, 1999 |
| 6,161,999 | Toggle Bolt Device | Dec. 19, 2000 |
| 6,203,260 | Toggle Bolt Assembly With Bolt Centering Spacer | Mar. 20, 2001 |
| FR1236,439 | Dispositif de soutenement par bil-broche notamment pour plafonds de galeries de mines | Jun. 07, 1960 |
| DE1092415 | Anke fur den Ankerausbau | Nov. 10, 1960 |
| DE1936360 | | May 1970 |

BRIEF SUMMARY OF THE INVENTION

The present invention provides an improved toggle bolt type device or fastener that can be used to join two members together such as a pair of panels, structures, flanges or the like. For example, the present invention can be used to join two spool pieces with pipe flanges together (see FIG. 13) wherein each of the flanges has an opening of a selected diameter. The fastener of the present invention can extend through the openings for holding or fastening the two flanges together.

The apparatus includes an elongated body having first and second end portions and a central, longitudinal bore that is partially threaded. A first end portion of the body has a socket and a plurality of circumferentially spaced apart, radially extending slots that communicate with the socket.

A shaft extends through the bore of the body and has respective first and second end portions that communicate with the body end portion. The shaft is partially externally threaded and rotates relative to the body. The partially externally threaded portion of the shaft engages an internally threaded portion of the body at the bore.

A plurality of locking members are attached to the shaft at a first end portion of the body. The locking members can be attached to a plate mounted to the first end portion of the shaft.

The locking members are movable between extended and retracted positions responsive to a rotation of the shaft. Rotating the shaft in either of two selected direction can either move the locking members from an extended to a retracted position or from a retracted to an extended position.

In the locking position, the locking members extend radially beyond the outer surface of the body and the selected diameter. This enables the projecting, locking members in the extended position to engage one side of a selected member or members to be held together (wall, panels, flanges, etc). A fastener such as a nut is then connectable to the body at a partially externally threaded portion and opposite the locking members. The nut can then be tightened against the locking members so that compression can be applied to the shaft for holding the selected structures, flanges, panels together or for attaching the apparatus to a selected structure (wall, flange, beam, etc).

The apparatus of the present invention can be used to form an attachment to a wall, panel, beam, plate, slab or other structure by inserting the body through an opening in the selected structure when the locking members are retracted and then moving the locking members to an extended position so that they can form an attachment to the selected structure at one end portion of the opening (see FIGS. 9–11). At the opposite end portion of the opening, the nut can be attached to the body and threadably engaged thereto for supplying compression to the body and for holding and anchoring the entire apparatus into a selected position at the opening (see FIGS. 11 and 13).

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a side view of the preferred embodiment of the apparatus of the present invention;

FIG. 2 is an end view taken along lines 2—2 of FIG. 1;

FIG. 3 is an end view taken along lines 3—3 of FIG. 1;

FIGS. 4–4A are sectional views taken along lines 4—4 of FIG. 1;

FIG. 5 is a partial, perspective, exploded view of the preferred embodiment of the apparatus of the present invention;

FIG. 6 is a sectional view taken along lines 6—6 of FIG. 1;

FIG. 7 is a partial sectional view of the preferred embodiment of the apparatus of the present invention;

FIG. 8 is a partial perspective view of the preferred embodiment of the apparatus of the present invention;

FIG. 12 is a fragmentary view of the preferred embodiment of the apparatus of the present invention illustrating the extension member;

FIG. 13 is a perspective, partially cut away elevation view of the preferred embodiment of the apparatus of the present invention showing it in use with the extension of FIG. 12 and holding two spool pieces together at ring type joint weld neck flanges.

DETAILED DESCRIPTION OF THE INVENTION

Figure 9:
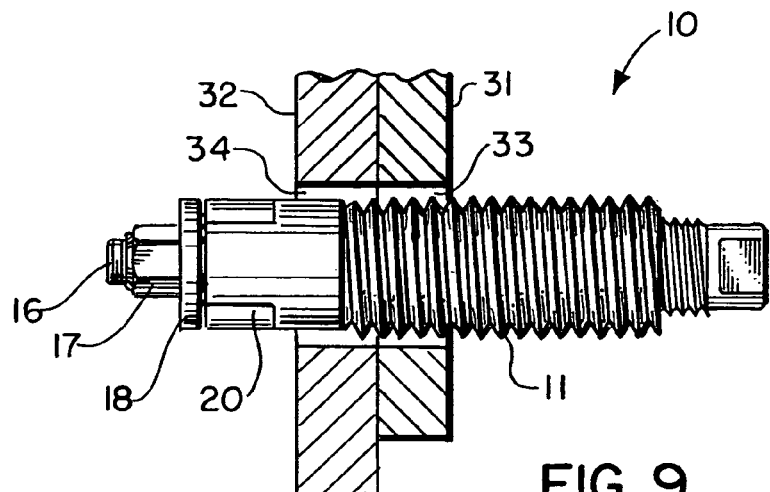
FIGS. 9–11 are sectional elevation views of the preferred embodiment of the apparatus of the present invention showing a sequence of attachment to a pair of panels, each having an opening, the openings being aligned.

FIGS. 1–11 show the preferred embodiment of the apparatus of the present invention designated generally by the numeral 11 in FIGS. 1 and 9–11. Fastener apparatus 10 includes a body 11 that has external threads 12 and a central longitudinal bore 13. The external threads 12 can be provided of a first diameter along a majority of the length of the body 11. A second threaded portion 28 is of a smaller diameter than the threaded portion 12 as shown in FIG. 1. As will be described hereinafter, an extension 35 can attach at threads 28.

A shaft 14 is mounted in the central longitudinal bore 13 of body 11. Shaft 14 has external threads 15 that engage internal threads of central longitudinal bore 13. In this fashion, when the shaft 14 is rotated, it also moves a slight distance linearly because of the engagement of the external threads 15 of shaft 14 and the internal threads of body 11 at central longitudinal bore 13. This threaded engagement functions as a stop in one (clockwise) direction.

Shaft 14 has a threaded end portion 16 that receives locking nut 17. The opposite end portion of shaft 14 provides end portion 27 having a tool receptive socket 26.

A circular plate 18 is shown in FIGS. 1–5 having a plurality of pegs 22 and a central internally threaded opening 19. A plurality of locking members 20 are mounted respectively on the plurality of pegs 22 as shown in FIGS. 3–5. Each locking member 20 has a pivot hole 21 that enables the locking member to be pivotally mounted upon a peg 22. In FIG. 4, the rotating plate 18 can be provided with three locking members 20. In FIG. 4A, the plate 18A can be provided with two pegs 22 and two locking members 20 as shown.

Body 11 has a socket 24 at one end portion thereof and a plurality of slots 23 that communicate with socket 24 as shown in FIG. 8. The socket 24 is receptive of the locking members 20 when they are in the retracted position of FIGS. 1, 4, 4A and 6. When the locking members 20 are moved to an extended position as shown in FIG. 7, the locking members 20 extend through slots 23 as shown in FIG. 7. In FIG. 8, the slots 23 extend radially and are circumferentially spaced as shown.

A wrench 29 (see FIGS. 6 and 9–11) can be used to move the locking members 20 between the retracted position of FIGS. 1, 4, 4A and 6 to the extended position of FIG. 7. The wrench 29 can, for example, be an allen wrench that fits a hexagonal socket or other like tool receptive socket 26 at end portion 27 of shaft 14. By rotating the wrench 29 in the direction of arrow 48 in FIG. 6 (counterclockwise) the shaft 14 engages the threaded portion of body 11 with its own threads 15, rotating plate 18 and pegs 22. A canning surface 25 on body 11 at socket 24 combine with the curved shape of each of the locking members 20 causes the locking members to move to the extended position of FIG. 7 when shaft 14 is rotated counter clockwise relative to body 11.

During use, the apparatus 10 is first placed in the retracted position of FIGS. 1, 6, 4, 4–8 and 9 and then inserted through a selected opening such as the aligned openings 33, 34 as shown in FIG. 9. First member 31 can have an opening 33. Similarly, second member 32 can have an opening 34 so that the fastener of the present invention can be used to hold the first member 31 and second member 32 together.

Figure 10:
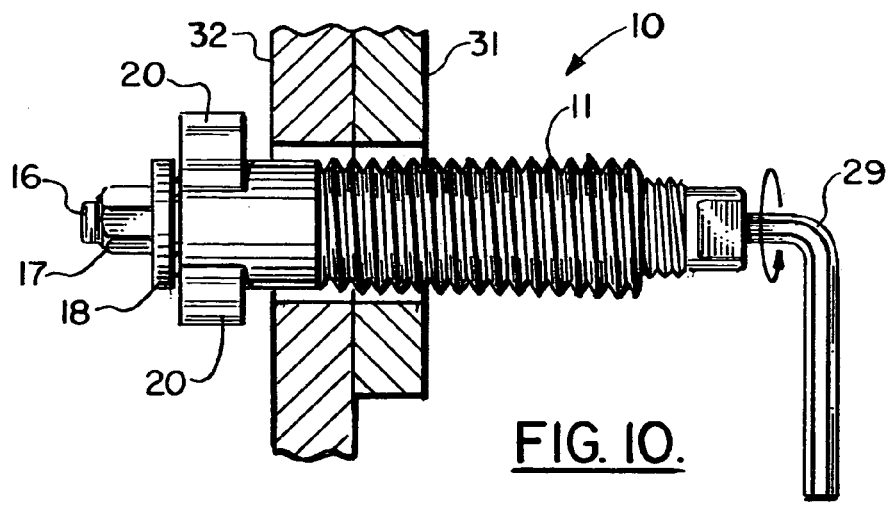
Figure 11:
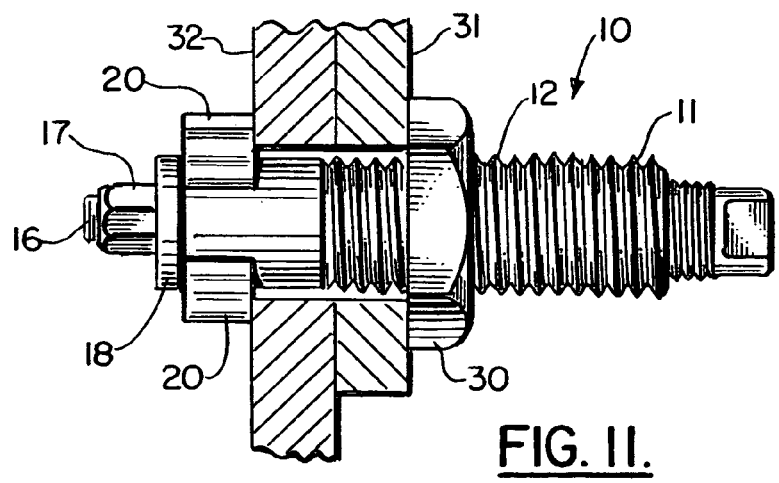

After the body 11 passes through both openings 33, 34 as shown in FIG. 9. wrench 29 can be used to move the locking members 20 to the extended position of FIG. 10. In this position, the locking members 20 extend well beyond the diameter of openings 33, 34 as shown in FIG. 10. Nut 30 can then be attached to body 11 at external threads 12. Rotation of nut 30 enables compression to be generated against the panels 31, 32 as the nut 30 is moved closer to the projecting locking members 20 as shown in FIG. 11. The nut 30 is tightened against the projecting locking members 20.

In FIG. 12, an extension 35 is shown that can be added to the body 11 as shown in FIG. 13. Extension 35 has a body 36 with a central longitudinal bore that receives shaft 37. A socket 38 at one end portion of body 36 provides internal threads 49. Body 36 has external threads 39. Shaft 37 has end portion 40 with a tool receptive socket 26 that can be a hexagonal shape such as the socket 26 of shaft 14. End portion 41 of shaft 37 can be a hexagonal projecting portion that engages tool receptive socket 26 of body 11 when extension is to be used. In order to connect extension 35 to body 11, the external threads 28 of body 11 engage the internal threads 49 of extension 35. This connection can be seen in FIG. 13.

In FIG. 13, a pair of spool pieces 44, 45 are to be joined together. Each of the spool pieces 44, 45 provides a pipe flange such as, for example, a ring type joint weld neck flange. The spool piece 44 has flange 42, the spool piece 45 has flange 43. Each of the flanges has bolt openings through which the apparatus 10 of the present invention is inserted for forming a connection. The flange 42 has bolt hole opening 46. The flange 43 has bolt opening 47. As with the illustration in FIGS. 9–11, the combination of body 11 and extension 35 are placed through the openings 46, 47 as shown in FIG. 13. A wrench 29 has then used to rotate shaft 37 which is connected to shaft 14 and also rotates it. In this fashion, the projecting locking members 20 can be moved to the extended position so that they extend will beyond the diameter of bolt hole opening 46 as shown in FIG. 13. Nut 30 can then be added to the external threads 39 of extension 35 as shown in FIG. 13 and tightened for pulling the flanged spool pieces 44, 45 together as indicated schematically by arrows 51 in FIG. 13. The present invention can be used to join structures, such as spool pieces together in crowded areas (eg. oil platforms, refineries) wherein access to each flange may be limited making conventional tools useless.

PARTS LIST

The following is a list of suitable parts and materials for the various elements of the preferred embodiment of the present invention.

| Part No. | Description |
| --- | --- |
| 10 | fastener apparatus |
| 11 | body |
| 12 | external threads |
| 13 | central longitudinal bore |
| 14 | shaft |
| 16 | threaded end portion |
| 17 | locking nut |
| 18 | circular rotating plate |
| 19 | opening |
| 20 | locking member |
| 21 | locking member pivot hole |
| 22 | peg |
| 23 | slot |
| 24 | socket |
| 25 | cam surface |
| 25A | cam surface |
| 26 | tool socket |
| 27 | end portion |
| 28 | external threads |
| 29 | wrench |
| 30 | nut |
| 31 | first member |
| 32 | second member |
| 33 | opening |
| 34 | opening |
| 35 | extension |
| 36 | body |
| 37 | shaft |
| 38 | socket |
| 39 | external threads |
| 40 | end portion |
| 41 | end portion |
| 42 | pipe flange |
| 43 | pipe flange |
| 44 | spool piece |
| 45 | spool piece |
| 46 | bolt hole |
| 47 | bolt hole |
| 48 | arrow |
| 49 | internal threads |
| 50 | external threads |
| 51 | arrow |

The foregoing embodiments are presented by way of example only; the scope of the present invention is to be limited only by the following claims.

The invention claimed is:

1. A toggle bolt device comprising;
a) an elongated tool body having an outer surface with an at least partially threaded portion, first and second end portions and a central, longitudinal bore having a longitudinal axis and internal threads, the first end portion of the body having a socket and a plurality of circumferentially spaced apart and radially extending slots that communicate with the socket radially extending from the socket to the outer surface of the tool body;
b) the tool body including a shaft that extends continuously through the longitudinal bore and having respective first and second end portions communicating with the body end portions, the shaft having external threads that engage the internal threads of the tool body, the shaft being rotatable relative to the body about said longitudinal axis;
c) a plate that carries a plurality of locking members, each locking member having a thicker inner end portion and a thinner outer end portion, wherein the plate is attached to and rotates with the shaft at the first end portion of the body;
d) the locking members being movably attached to the plate, each locking member being rotatable: 1) relative to the plate and 2) about the shaft when the locking members move between extended and retracted positions responsive to a rotation of the shaft and plate relative to the tool body, the locking members extending radially beyond the outer surface of the body in the extended position and being pulled into the body at the socket in the retracted position;
e) a nut that is connectable to the body with a threaded connection portion; and
f) wherein load transfer between the plate and the nut is via the plate, locking members, tool body and shaft.

2. The toggle bolt of claim 1 wherein there are at least three locking members.

3. A toggle bolt device comprising;
a) an elongated body having an outer surface with external threads, first and second end portions and a central, longitudinal bore having a central longitudinal axis and internal threads, the first end portion of the body having a socket and a plurality of circumferentially spaced apart radially extending slots that communicate with the socket;
b) the tool body including a shaft that extends through the bore and having respective first and second end portions communicating with the body end portions, the shaft having external threads that engage the internal threads of the tool body and rotatable relative to the body;
c) a plate mounted to the shaft, the plate carrying a plurality of locking members that each vary in thickness, the locking members being movably attached to the plate in between the plate and the external threads of the tool body;
d) the locking members being movable between extended and retracted positions in a plane that is generally perpendicular to the central longitudinal axis and responsive to a rotation of the shaft and the plate relative to the tool body, the locking members being rotatable: 1) relative to the plate and 2) about the shaft and extending radially beyond the outer surface of the body in the extended position and being pulled into the body at the socket in the retracted position;
e) wherein the locking members have curved outer surfaces;
f) a nut that is connectable to the external threads of the body; and
g) wherein the combination of tool body and shaft extends continuously from the plate to the nut, enabling load transfer between the plate and the nut via the shaft.

4. A toggle bolt device comprising;
a) an elongated body having an outer surface with an at least partially threaded portion, first and second end portions and a central, longitudinal bore that is at least partially threaded, the first end portion of the body having a socket and a plurality of circumferentially spaced apart slots that communicate with the socket;
b) the tool body including a shaft that extends through the bore and having respective first and second end portions communicating with the body end portions, the shaft being at least partially externally threaded and rotatable relative to the body;
c) a plate attached to the second end portion of the shaft for rotation therewith;
d) a plurality of locking members that each vary in thickness, the locking members each being are attached to the plate;

e) the locking members being rotatable: 1) relative to the plate and 2) about the shaft and movable between extended and retracted positions responsive to a rotation of the shaft and plate, the locking members extending radially beyond the outer surface of the tool body outer surface in the extended position and being pulled into the tool body at the socket in the retracted position;

f) a nut that is connectable to the external threads;

g) wherein the body has curved camming surfaces at the socket that are positioned to guide movement of the locking members as they travel between the extended and retracted positions; and h) wherein the shaft attaches to the plate, enabling load transfer between the plate and the nut via the locking members, shaft and tool body.

5. A toggle bolt device comprising;

a) an elongated tool body having an outer surface with an at least partially threaded portion, first and second end portions and a central, longitudinal bore having internal threads, the first end portion of the body having a socket and a plurality of circumferentially, radially extending spaced apart slots that communicate with the socket;

b) a shaft that extends through the bore and having respective first and second end portions communicating with the body end portions, the shaft having external threads that engage the internal threads of the tool body, the shaft being rotatable relative to the tool body;

c) a plate attached to the second end portion of the shaft for rotation therewith;

d) a plurality of locking members that each vary in thickness, the locking members are attached to the plate;

e) the locking members being rotatable: 1) relative to the plate and 2) about the shaft and movable between extended and retracted positions responsive to a rotation of the shaft and in a plane that is generally perpendicular to the central longitudinal shaft, the locking members extending radially beyond the outer surface of the body in the extended position and being contained within the body at the socket in the retracted position;

f) a nut that is connectable to the tool body at the external threads; and g) wherein the tool body and shaft extends continuously from the plate to the nut, enabling load transfer between the plate and the nut via the tool body, locking members, and shaft.

6. The toggle bolt of claim 5 wherein the shaft has a first threaded portion that connects with the plate and a second threaded portion that engages the body.

7. A toggle bolt device comprising;

a) an elongated tool body having an outer surface with external threads, first and second end portions and a central, longitudinal bore having internal threads, the first end portion of the body having a socket and a plurality of circumferentially spaced apart and radially extending slots that communicate with the socket;

b) a shaft that extends through the bore and having respective first and second end portions communicating with the body end portions, the shaft having external threads that engage the internal threads of the tool body, the shaft being and rotatable relative to the tool body;

c) a plate carrying a plurality of locking members that each vary in thickness, the plate being attached to the shaft at the first end portion of the tool body, the plate and locking members being pivotally attached to the plate;

d) the locking members being rotatable: 1) relative to the plate and 2) about the shaft and movable between extended and retracted positions responsive to a rotation of the shaft and plate, the locking members extending radially beyond the outer surface of the body in the extended position and being contained within the body at the socket in the retracted position;

e) a nut that is connectable to the body external threads;

f) wherein the shaft has a tool receptive portion at one end thereof that enables rotation of the shaft relative to the body; and g) wherein the shaft and tool body extends continuously from the plate to the nut, enabling load transfer between the plate and the nut via the plate, locking members, tool body and shaft.

8. The toggle bolt of claim 1 wherein the nut engages the body generally opposite the locking members.

9. The toggle bolt of claim 1 wherein the shaft moves linearly relative to the central longitudinal axis of the body when the shaft is rotated.

10. A fastener for joining two members together, each member having an opening therethrough of a selected diameter, comprising;

a) an elongated body having an outer surface with an at least partially threaded portion, first and second end portions and a central, longitudinal bore that is partially threaded, the first end portion of the body having a socket and a plurality of circumferentially spaced apart, radially extending slots that communicate with the socket;

b) a shaft that extends through the bore and having respective first and second end portions communicating with the body end portions, the shaft being partially externally threaded and rotatable relative to the body, the partially externally threaded portion of the shaft engaging the threaded portion of the bore;

c) a plate carrying a plurality of locking members that each engage the plate, the plate being attached to the shaft at the first end portion of the body, the plate;

d) the plate and locking members being movable between extended and retracted positions responsive to a rotation of the shaft relative to the tool body, the locking members being rotatable: 1) relative to the plate and 2) about the shaft and extending radially beyond the outer surface of the body and the selected diameter in the extended position and being pulled into the body at the socket and inside the selected diameter in the retracted position;

e) a nut that is connectable to the body at the external threads; and f) wherein the combination of tool body and shaft extends continuously from the plate to the nut, enabling load transfer between the plate and the nut via the locking members, tool body and shaft.

11. A bolt apparatus comprising;

a) an elongated tool body having an outer surface with external threads, first and second end portions and a central, longitudinal bore having internal threads the first end portion of the body having a socket and a plurality of circumferentially spaced apart slots that communicate with the socket;

b) a shaft that extends through the bore and having respective first and second end portions positioned next to the respective body end portions, the shaft having external threads that engage the tool body internal threads and being rotatable relative to the tool body;

c) a plate attached to the shaft next to the first end portion of the body, the plate having a plurality of locking members attached thereto at the first end portion of the shaft;

d) the locking members being rotatable: 1) relative to the plate and 2) about the shaft and movable between extended and retracted positions responsive to a rotation of the shaft, the locking members extending radially beyond the outer surface of the body in the extended position and being pulled into the body at the socket in the retracted position;

e) a nut that is connectable to the body external threads; and f) wherein the combination of tool body and shaft extends continuously from the plate to the nut, enabling load transfer between the plate and the nut via the plate locking members, tool body and shaft.

12. The bolt apparatus of claim 11 wherein there are at least three locking members a nut that is connectable to the body at the partially threaded portion.

13. A bolt apparatus comprising;

a) an elongated tool body having an outer surface with external threads, first and second end portions and a central, longitudinal bore having internal threads, the first end portion of the body having a socket and a plurality of circumferentially spaced apart slots that communicate with the socket;

b) a shaft that extends through the bore and having respective first and second end portions communicating with the body end portions, the shaft having external threads that engage the tool body internal threads and the shaft and plate being rotatable together relative to the body;

c) a plate carrying a plurality of locking members attached thereto next to the first end portion of the body;

d) the locking members being rotatable: 1) relative to the plate and 2) about the shaft and movable between extended and retracted positions responsive to a rotation of the shaft, the locking members extending radially beyond the outer surface of the body in the extended position and being contained within the body at the socket in the retracted position;

e) wherein the locking members have curved outer surfaces;

f) a nut that is connectable to the body at the partially threaded portion; and g) wherein the combination of tool body and shaft extends continuously from the plate to the nut, enabling load transfer between the plate and the nut via the plate, locking members, tool body and shaft.

14. A bolt apparatus comprising;

a) an elongated body having an outer surface with an at least partially threaded portion, first and second end portions and a central, longitudinal bore that is at least partially threaded, the first end portion of the body having a socket and a plurality of circumferentially spaced apart slots that communicate with the socket;

b) a shaft that extends through the bore and having respective first and second end portions communicating with the body end portions, the shaft being at least partially externally threaded and rotatable relative to the body;

c) a plate attached to the first end portion of the shaft for rotation therewith, the plate carrying a plurality of locking members, being attached to the plate;

d) the locking members being rotatable: 1) relative to the plate and 2) about the shaft and movable between extended and retracted positions responsive to a rotation of the shaft, the locking members extending radially beyond the outer surface of the body in the extended position and being contained within the body at the socket in the retracted position;

e) a nut that is connectable to the external threads of the tool body;

f) wherein the tool body has curved camming surfaces at the sockets that are positioned to guide movement of the locking members as they travel between the extended and retracted positions; and g) wherein a combination of the tool body and shaft extends continuously from the plate to the nut, enabling load transfer between the plate and the nut via the plate, locking members, tool body and shaft.

15. A bolt device comprising;

a) an elongated body having an outer surface with an at least partially threaded portion, first and second end portions and a central, longitudinal bore that is at least partially threaded, the first end portion of the body having a socket and a plurality of circumferentially spaced apart slots that communicate with the socket;

b) a shaft that extends through the bore and having respective first and second end portions communicating with the body end portions, the shaft being at least partially externally threaded, the externally threaded portions of the shaft engaging the internally threaded portion of the tool body and the shaft being rotatable relative to the body;

c) a plate attached to the second end portion of the shaft for rotation therewith;

d) a plurality of locking members, each attached to the plate;

e) the locking members being rotatable: 1) relative to the plate and 2) about the shaft and movable between extended and retracted positions responsive to a rotation of the shaft, the locking members extending radially beyond the outer surface of the body in the extended position and being contained within the body at the socket in the retracted position;

f) a nut that is connectable to the externally threaded portion of the tool body; and g) wherein the combination of tool body and shaft extends continuously from the plate to the nut, enabling load transfer between the plate and the nut via the plate, locking members, tool body and shaft.

16. The toggle bolt of claim 15 wherein the shaft has a first threaded portion that connects with the plate and a second threaded portion that engages the body.

17. A toggle bolt device comprising;

a) an elongated body having an outer surface with an externally threaded portion, first and second end portions and a central, longitudinal bore having internal threads, the first end portion of the body having a socket and a plurality of circumferentially spaced apart slots that communicate with the socket;

b) a continuous shaft that extends through the bore and having respective first and second end portions communicating with the body end portions, the shaft being at least partially externally threaded and connected to the internal threads of the tool body and rotatable relative to the body;

c) a plate attached to the shaft at the first end portion of the body carrying a plurality of locking members, each attached to the plate;

d) the locking members being rotatable: 1) relative to the plate and 2) about the shaft and movable between extended and retracted positions responsive to a rotation of the shaft and the plate, the locking members extending radially beyond the outer surface of the body in the extended position and being contained within the body at the socket in the retracted position;

e) a nut that is connectable to the body at the externally threaded portion;

f) wherein the shaft has a tool receptive portion at one end thereof that enables rotation of the shaft relative to the body; and g) wherein the shaft extends continuously from the plate to the nut, enabling load transfer between the plate and the nut via the plate, locking members, tool body and shaft.

18. The bolt of claim 17 wherein the nut engages the body generally opposite the locking members.

19. The bolt of claim 17 wherein the shaft moves linearly relative to the central longitudinal axis of the body when the shaft is rotated.

20. A fastener for joining two members together, each member having an opening therethrough of a selected diameter, comprising;

a) an elongated tool body having an outer surface with external threads, first and second end portions and a central, longitudinal bore having internal threads, the first end portion of the body having a socket and a plurality of circumferentially spaced apart, radially extending slots that communicate with the socket;

b) a shaft that extends through the bore and having respective first and second end portions communicating with the body end portions, the shaft having external threads that engage the tool body internal threads, the shaft being rotatable relative to the body;

c) a plate attached to the shaft at the first end portion of the body, the plate rotating with the shaft;

d) a plurality of locking members, each attached to the plate and being rotatable: 1) relative to the plate and 2) about the shaft and movable between extended and retracted positions responsive to a rotation of the shaft and plate relative to the tool body, the locking members extending radially beyond the outer surface of the body in the extended position and being contained within the body at the socket in the retracted position;

e) a nut that is connectable to the body external threads; and f) wherein the combination of tool body and shaft extends continuously from the plate to the nut, enabling load transfer between the plate and the nut via the plate, locking members, tool body and shaft.

* * * * *